United States Patent
Miller et al.

(10) Patent No.: US 11,946,581 B2
(45) Date of Patent: Apr. 2, 2024

(54) CONNECTOR COVER AND METHODS

(71) Applicant: Federal Signal Corporation, Oak Brook, IL (US)

(72) Inventors: Michael E Miller, Bloomington, IL (US); Benjamen Michael Schmitt, Princeton, IL (US)

(73) Assignee: Federal Signal Corporation, Oak Brook, IL (US)

( * ) Notice: Subject to any disclaimer, the term of this patent is extended or adjusted under 35 U.S.C. 154(b) by 98 days.

(21) Appl. No.: 17/465,401

(22) Filed: Sep. 2, 2021

(65) Prior Publication Data

US 2023/0060911 A1    Mar. 2, 2023

(51) Int. Cl.
*F16L 35/00* (2006.01)
*F16L 57/00* (2006.01)
*F16L 57/06* (2006.01)

(52) U.S. Cl.
CPC ............. *F16L 57/005* (2013.01); *F16L 35/00* (2013.01); *F16L 57/06* (2013.01); *F16L 2201/20* (2013.01); *F16L 2201/80* (2013.01)

(58) Field of Classification Search
CPC .......... F16L 57/005; F16L 35/00; F16L 57/06
See application file for complete search history.

(56) References Cited

U.S. PATENT DOCUMENTS

| | | | | |
|---|---|---|---|---|
| 2,308,073 A | * | 1/1943 | Joseph | F16D 3/845 285/226 |
| 3,388,705 A | * | 6/1968 | Grosshandler | A61M 16/0463 128/207.14 |
| 3,796,103 A | * | 3/1974 | Winfield, Jr. | F16J 15/52 285/226 |
| 4,484,772 A | * | 11/1984 | Ross, Sr. | F16L 51/025 285/280 |
| 4,583,668 A | * | 4/1986 | Maynard, Jr. | B65D 25/48 215/390 |
| 4,593,690 A | * | 6/1986 | Sheridan | A61M 16/0875 138/119 |
| 4,852,564 A | * | 8/1989 | Sheridan | A61M 16/08 138/119 |
| 4,923,432 A | * | 5/1990 | Porter | F16J 3/041 464/175 |

(Continued)

FOREIGN PATENT DOCUMENTS

| | | | |
|---|---|---|---|
| DE | 2809123 A1 | * | 9/1979 |
| EP | 0339234 A1 | * | 11/1989 |

(Continued)

OTHER PUBLICATIONS

Photo of tapered joint extension, published prior to Sep. 2, 2021.

(Continued)

*Primary Examiner* — Zachary T Dragicevich
*Assistant Examiner* — James A Linford
(74) *Attorney, Agent, or Firm* — Merchant & Gould P.C.

(57) ABSTRACT

A removable cover to protect a connector between two conduits includes a single body having a wall surrounding an interior volume. The body has a neck sized to grip a portion of a first of the conduits. The body has a size-adjustable section to permit the body to be shortened or lengthened. The body has a casing section. The casing section protects a coupling connecting together the two conduits.

12 Claims, 12 Drawing Sheets

(56) References Cited

U.S. PATENT DOCUMENTS

| | | | | |
|---|---|---|---|---|
| 4,932,257 A | * | 6/1990 | Webb | B29C 66/1224 |
| | | | | 285/21.2 |
| 4,953,897 A | * | 9/1990 | Klober | E04D 13/1476 |
| | | | | 285/236 |
| 5,176,390 A | * | 1/1993 | Lallement | F16J 3/043 |
| | | | | 403/50 |
| 5,287,849 A | * | 2/1994 | Piper | A61M 16/08 |
| | | | | 128/207.14 |
| 6,328,498 B1 | * | 12/2001 | Mersch | B25B 27/28 |
| | | | | 403/175 |
| 6,951,336 B2 | * | 10/2005 | Martin | F16J 3/045 |
| | | | | 277/315 |
| 7,726,309 B2 | * | 6/2010 | Ho | A61M 16/0633 |
| | | | | 128/912 |
| 8,523,690 B2 | * | 9/2013 | Takabe | F16D 3/845 |
| | | | | 464/175 |
| 2014/0167407 A1 | * | 6/2014 | Brinkley | F16L 37/28 |
| | | | | 285/226 |
| 2015/0075624 A1 | * | 3/2015 | Mahaffa | B67D 7/002 |
| | | | | 138/109 |
| 2017/0007868 A1 | * | 1/2017 | Aguilar | A62C 35/68 |

FOREIGN PATENT DOCUMENTS

| | | | | |
|---|---|---|---|---|
| GB | 2228300 A | * | 8/1990 | ............ F16L 27/11 |
| WO | WO-2014063706 A1 | * | 5/2014 | ............ E03F 7/06 |
| WO | WO-2017192104 A1 | * | 11/2017 | ............ B60K 15/04 |

OTHER PUBLICATIONS

Photo of collapsible folding cup, published prior to Sep. 2, 2021.
Photo of male/female connector joint, published prior to Sep. 2, 2021.
Photo of sliding single piece cover, published prior to Sep. 2, 2021.
Photo of multi-piece connectors, published prior to Sep. 2, 2021.
Photo of helical wrap, published prior to Sep. 2, 2021.
Photo of snap bracelet, published prior to Sep. 2, 2021.
Photo of zipper or Velcro insultation cover, published prior to Sep. 2, 2021.

* cited by examiner

CONNECTOR COVER AND METHODS

TECHNICAL FIELD

This disclosure relates to protective covers to protect connector couplings and methods of use.

BACKGROUND

Connector couplings are used to connect two conduits, such as hoses or pipes. The couplings can be used in environments that are muddy or dirty. When debris becomes lodged in the joint, the connector can become inoperable.

In previous solutions, the debris needed to be either fought through, or washed off, so that the connector would be functional. This could be unproductive and frustrating. Improvements are desirable.

SUMMARY

A connector cover is provided that improves the prior art.

In one aspect, a removable cover to protect a connector between two conduits is provided. The cover comprises a single body having a wall surrounding an interior volume; the body having a first open end and an opposite second open end; each of the first open end and second open end being in communication with the interior volume to form a through opening from the first open end to the second open end; the body having a neck defining the first open end; the neck having a first inner diameter sized to grip a portion of a first of the conduits; the body having size-adjustable section to permit the body to be shortened or lengthened; and the body having a casing section defining the second open end; the casing section having a second inner diameter larger than the first inner diameter.

In an example embodiment, the body comprises a single material of rubber.

In one embodiment, the size-adjustable section comprises a plurality of folds.

The size-adjustable section is between and continuous with the neck and the casing section, in many examples.

In one or more examples, the size-adjustable section has a third inner diameter that is about the same as the first inner diameter.

The casing section may have a length greater than a length of the neck, and the size-adjustable section can be adjustable in length to be greater or less than the length of the casing section.

In example embodiments, the body has a longitudinal axis extending between the first and second open ends, and the size-adjustable section permits the body to be shortened or lengthened along the longitudinal axis.

In various embodiments, the size adjustable section is at least one of: a roll back cuff; a tapered joint; a collapsible material; a mating male and female connector joint; a sliding single piece; a multipiece interlocking system; a helical wrap; a snap flexible material; or an insulated cover having a fastener.

In another aspect, a system is provided. The system comprises a first conduit and a second conduit; a coupling connecting together the first conduit and second conduit; a first cover removably secured to the first conduit; and a second cover removably secured to the second conduit. Each of the first cover and second cover includes a single body having a wall surrounding an interior volume; the body having a first open end and an opposite second open end; each of the first open end and second open end being in communication with the interior volume to form a through opening from the first open end to the second open end; the body having a neck defining the first open end; the body having size-adjustable section to permit the body to be shortened or lengthened; and the body having a casing section defining the second open end; the neck of the first cover being sized to grip a portion of the first conduit; the neck of the second cover being sized to grip a portion of the second conduit; and the casing section of the first cover and of the second cover covering the coupling.

In many examples, the body of each of the first and second covers comprises a single material of rubber.

The size-adjustable section of each of the first and second covers can comprise a plurality of folds, example embodiments.

In some embodiments, the size-adjustable section of each of the first and second covers is between and continuous with the neck and the casing section.

In some embodiments, the first and second conduits are hoses.

In some embodiments, the first and second conduits are pipes.

In examples, the body has a longitudinal axis extending between the first and second open ends, and the size-adjustable section permits the body to be shortened or lengthened along the longitudinal axis.

In another aspect, a method of covering a coupling connecting together a first conduit and a second conduit is provided. The method comprises removably securing a first cover to the first conduit; removably securing a second cover to the second conduit; connecting together the first conduit and second conduit using a coupling. Each of the first cover and second cover includes a single body having a wall surrounding an interior volume; the body having a first open end and an opposite second open end; each of the first open end and second open end being in communication with the interior volume to form a through opening from the first open end to the second open end; the body having a longitudinal axis extending between the first and second open ends; the body having a neck defining the first open end; the body having size-adjustable section to permit the body to be shortened or lengthened along the longitudinal axis; and the body having a casing section defining the second open end; the neck of the first cover being sized to grip a portion of the first conduit; the neck of the second cover being sized to grip a portion of the second conduit; and the casing section of the first cover and of the second cover covering the coupling.

In example methods, there is a step of adjusting the length of the first cover and second cover along a longitudinal axis.

In example methods, the step of removably securing a first cover to the first conduit includes securing the first cover to one of a hose or a pipe.

In example methods, the step of removably securing a second cover to the second conduit includes securing the second cover to one of a hose or a pipe.

A variety of examples of desirable product features or methods are set forth in the description that follows, and in part, will be apparent from the description or maybe learned by practicing various aspects of this disclosure. The aspects of this disclosure may relate to individual features as well as combinations of features. It is to be understood that both the foregoing general description and the following detailed description are explanatory only, and are not restrictive of the claimed invention.

DETAILED DESCRIPTION

In reference now to FIGS. 1-4, an embodiment of a removable cover to protect a connector between two conduits is shown in general at 100. By "conduit", it is meant anything that conveys a fluid, which includes, as non-limiting examples, pipes, hoses, and nozzles.

The cover 100 includes a single body 102. The body 102 can be made from a variety of flexible materials, including, in non-limiting examples rubber, plastic (e.g., nylon), silicone, or blends thereof. It may also be made from non-flexible materials including metal.

In accordance with principles of this disclosure, the body 102 includes a wall 104. The wall 104 surrounds an interior volume 106. The body 102 has a first open end 108 and an opposite second open end 110. Each of the first open end 108 and second open end 110 is in communication with the interior volume 106 to form a through opening 112 from the first open end 108 to the second open end 110. The body 102 has a longitudinal axis 116 extending between the first and second open ends 108, 110.

Figure 1:
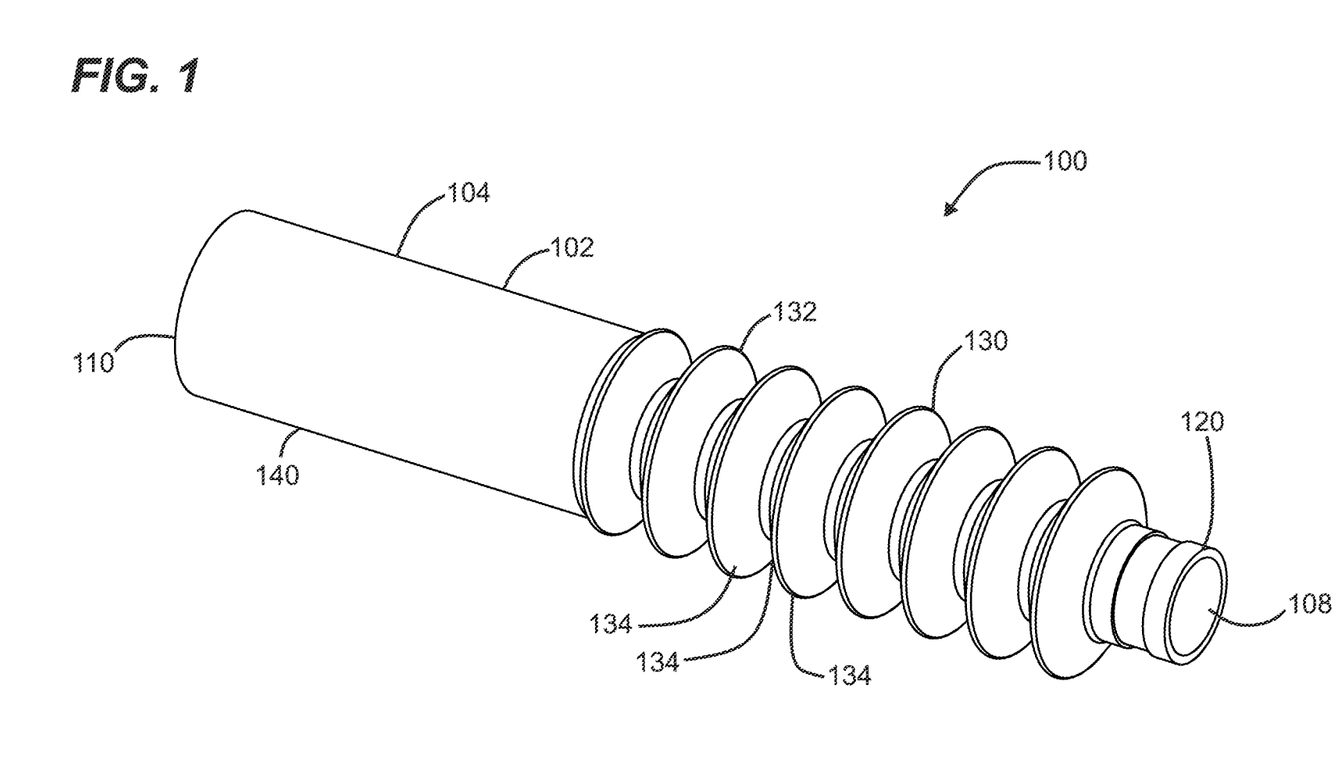
FIG. 1 is a perspective view of an example embodiment of a cover for a connector, constructed in accordance with principles of this disclosure.
Figure 2:
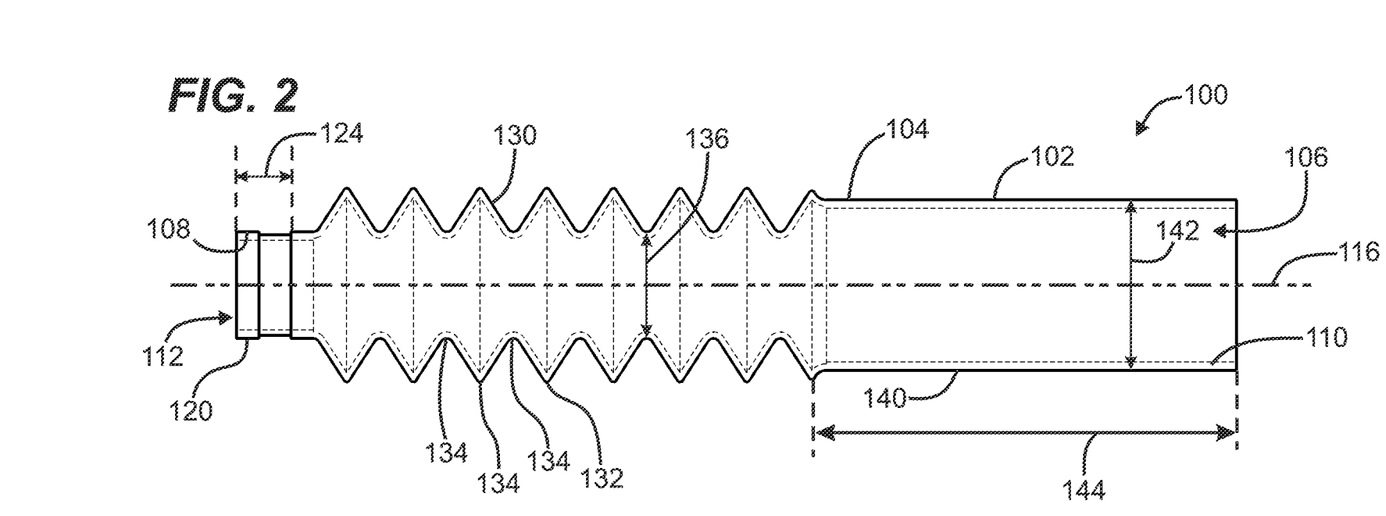
FIG. 2 is a cross-sectional view of the cover of FIG. 1.
Figure 3:
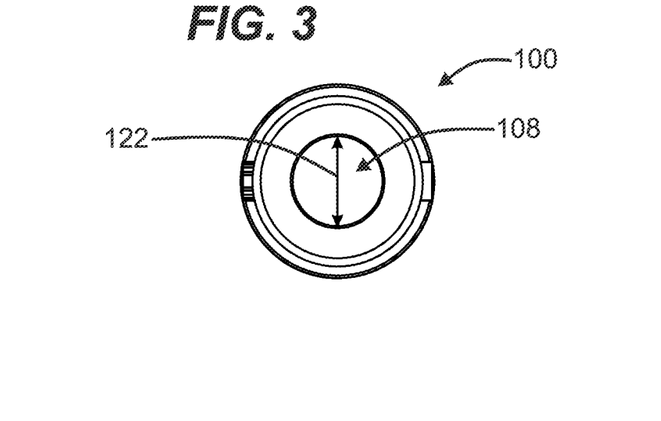
FIG. 3 is a left end view of the cover of FIG. 2.
Figure 4:
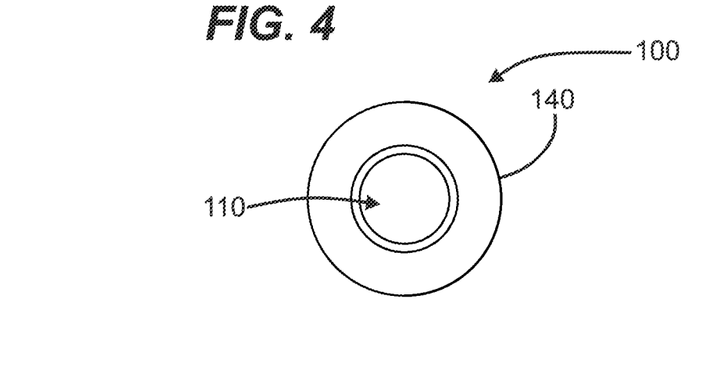
FIG. 4 is a right end view of the cover of FIG. 2.
Figure 5:
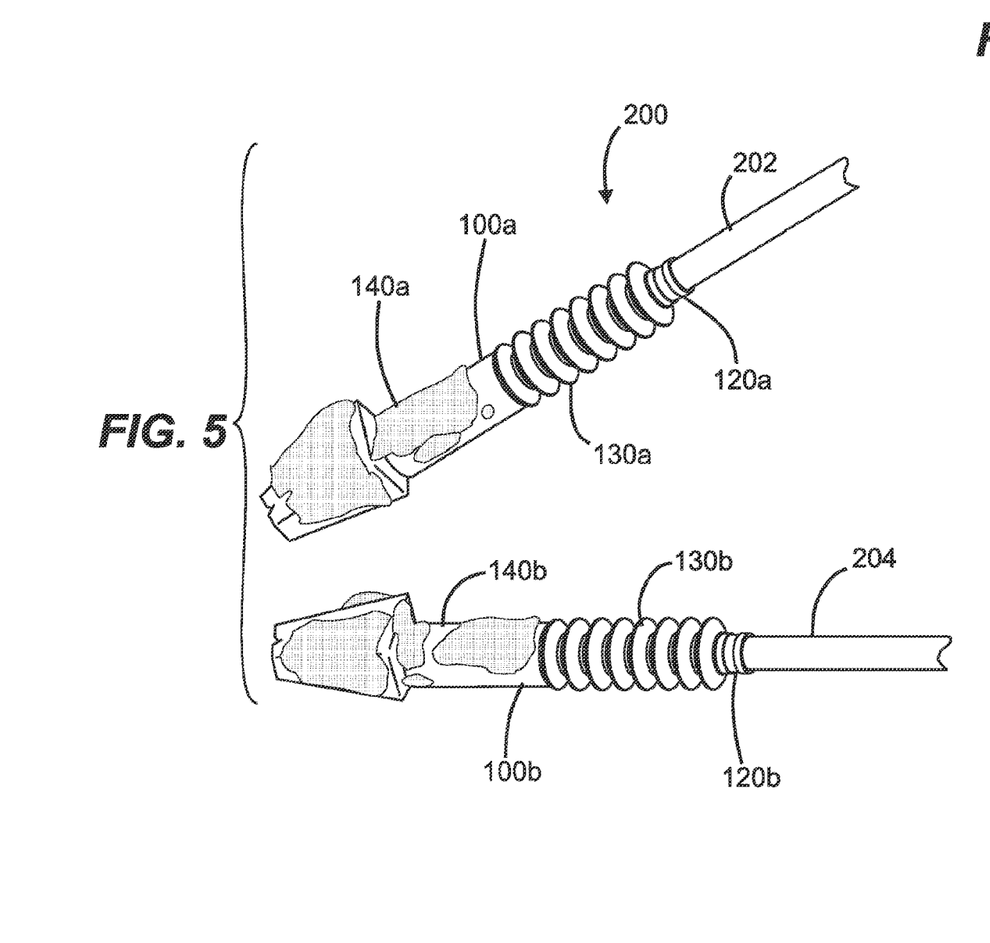
FIG. 5 is a schematic perspective view of a system including first and second conduits, each fitted with the cover of FIGS. 1-4.

In accordance with principles of this disclosure, the body 102 has a neck 120. The neck 120 defines the first open end 108. The neck 120 has a first inner diameter 122 sized to grip a portion of a first of the conduits 202 (FIG. 5). The neck 120 also has a neck length 124.

In accordance with principles of this disclosure, the body 102 has a size-adjustable section 130. The size-adjustable section 130 permits the body 102 to be shortened or lengthened along the longitudinal axis 116. The size-adjustable section 130 can be made in a variety of ways. In the example shown, the size-adjustable section 130 comprises a plurality of folds 132. In one example, the folds 132 are accordion style folds 134. The size-adjustable section 130 has an inner diameter 136. While many different sizes can be used, in one embodiment, the inner diameter 136 is about the same as the first inner diameter 122.

In accordance with principles of this disclosure, the body 102 has a casing section 140. The casing section 140 defines the second open end 110. The casing section 140 has a second inner diameter 142 larger than the first inner diameter 122. Typically, the casing section 140 is sized to cover a coupling 210 (FIG. 6) between two connected conduits.

In accordance with principles of this disclosure, the size-adjustable section 130 is between and continuous with the neck 120 and the casing section 140.

In accordance with principles of this disclosure, the casing section 140 has a length 144 greater than the neck length 124. The size-adjustable section 130 is adjustable in length to be greater or less than the length 144 of the casing section 140.

Figure 6:
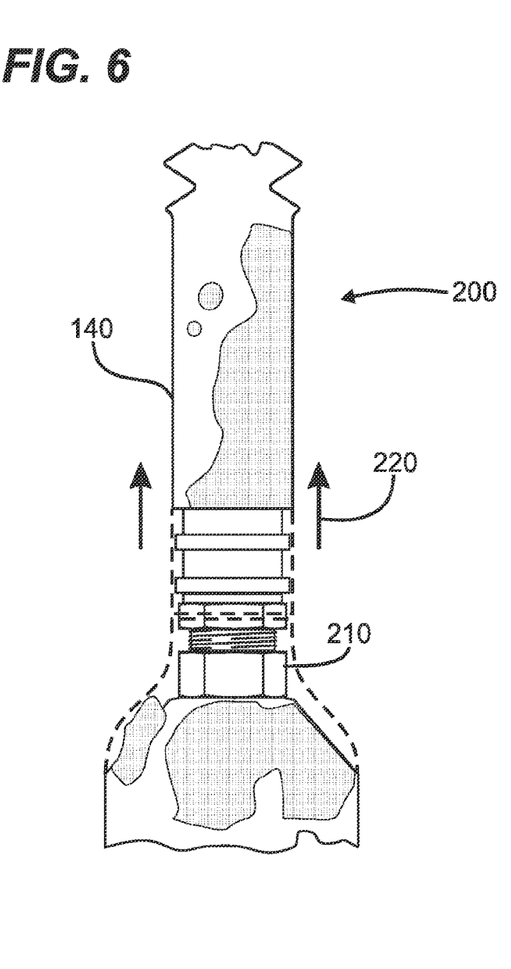
FIG. 6 is a schematic top plan view of the first and second conduits coupled together, each fitted with the cover of FIGS. 1-4.

In reference now to FIGS. 5 and 6, a system 200 using the cover 100 is illustrated. The system 200 includes first conduit 202 and a second conduit 204. The first and second conduits 202, 204 can include a variety of structures including flexible hoses, or rigid pipes, for example. The first and second conduits 202, 204 can be removably connected together with coupling 210.

To protect the coupling 210 from dirt and debris, the coupling 210 can be covered by using cover 100 on each of the first and second conduits 202, 204. In FIGS. 5 and 6, a first of the covers 100 is shown at 100a removably secured to the first conduit 202. A second of the covers 100 is shown at 100b removably secured to the second conduit 204. The neck 120a of the first cover 100a grips a portion of the first conduit 202, while the neck 120b of the second cover 100b grips a portion of the second conduit 100b. The casing section 140a, 140b of the first cover 100a and of the second cover 100b covers the coupling 210 as shown in FIG. 6 in phantom lines.

FIG. 6 shows each of the covers 100a, 100b shortened by moving the casing sections 140a, 140b in a direction toward the necks 120a, 120b, to shorten the lengths of the size-adjustable sections 130a, 130b. See the arrow 220 in FIG. 6, which demonstrates a step of shortening the cover 100 by pushing the casing section 140 toward the neck 120. The allows the coupling 210 to be exposed for manipulation by the user. The casing sections 140a, 140b protect the coupling 210 from dirt and debris, when in the fully extended position as shown in FIG. 5 covering the coupling 210.

The cover 100 can be used as part of a method of covering a coupling connecting together the conduits 202, 204. The method includes removably securing the first cover 100a to the first conduit 202, and removably securing the second cover 100b to the second conduit 204. The first conduit 202 and second conduit 204 can be connected together with coupling 210. To connect the conduits 202, 204 together, the covers 100a, 100b can be shortened by pushing against the size-adjustable sections 130a, 130b to expose the ends of the conduits 202, 204 and allow the coupling 210 to be applied to the ends of the conduits 202, 204. After the conduits 202, 204 are coupled together, the covers 100a, 100b can be lengthened by pulling on them and allowing the casing sections 140a, 140b to cover the connection and the coupling 210.

After a time, if the covers 100a, 100b become worn, they can be removed from the conduits 202, 204 and replaced with new covers 100a, 100b.

Additional Embodiments for Cover, FIGS. 7-19

Additional embodiments for the cover 100 are illustrated in FIGS. 7-19. Each of these embodiments include covers in which the length can be adjusted through various techniques. In each embodiment, the cover will be designated by reference number 100.

Figure 7:
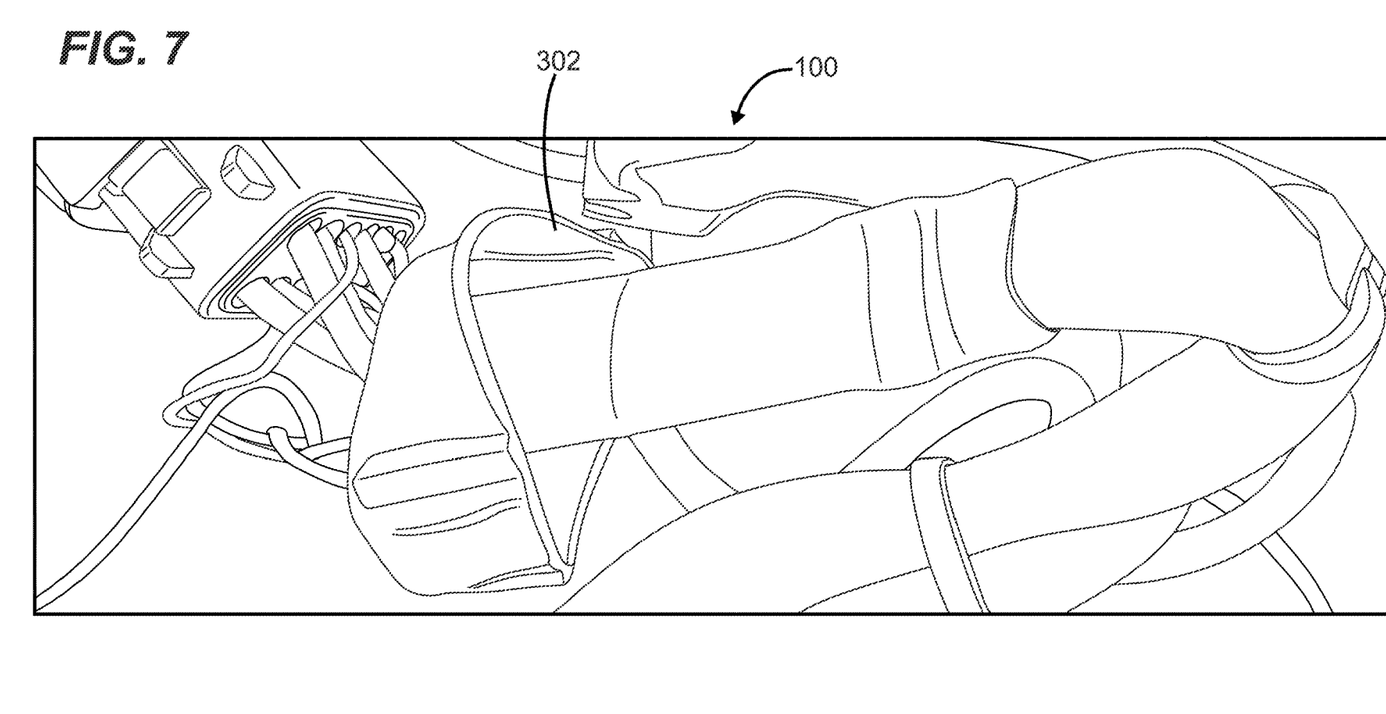
FIG. 7 is a perspective view of another embodiment of a cover showing a roll back method of adjustment.

In FIG. 7, the cover 100 is made of a flexible material, such as plastic, and can be rolled back at a cuff 302 to adjust the length.

Figure 8:
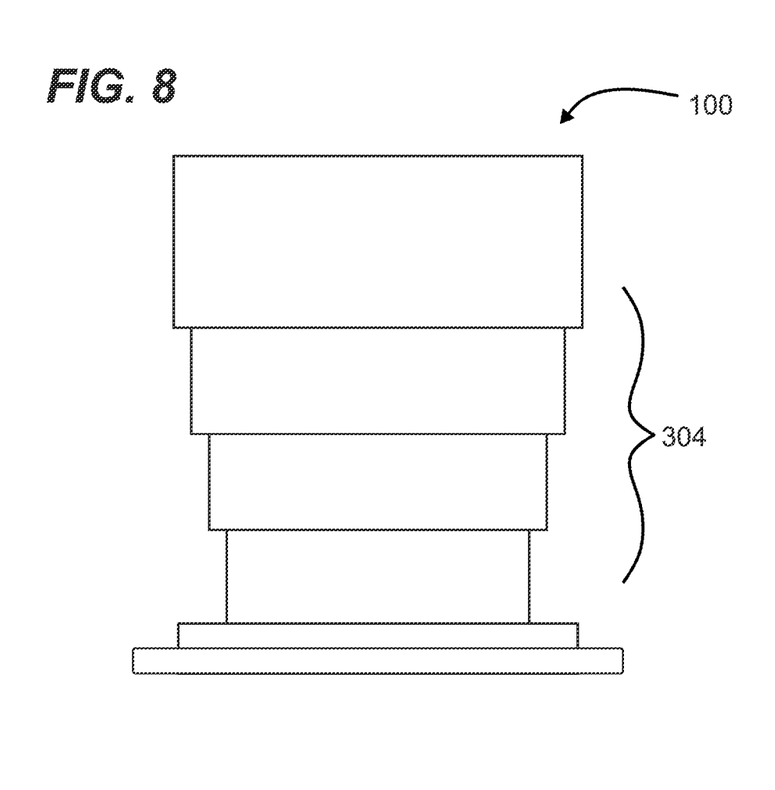
FIG. 8 is a perspective view of another embodiment of a cover showing a tapered joint extension.
Figure 9:
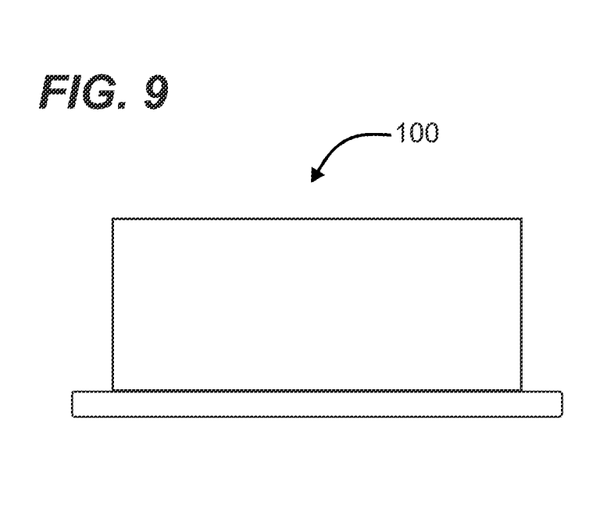
FIG. 9 is a perspective view of the cover of FIG. 8 in a shortened condition.

FIGS. 8 and 9 show the cover 100 having a tapered joint extension 304. FIG. 8 shows the cover 100 is a first, longer position, while FIG. 9 shows the cover 100 of FIG. 8 in a shortened condition.

Figure 10:
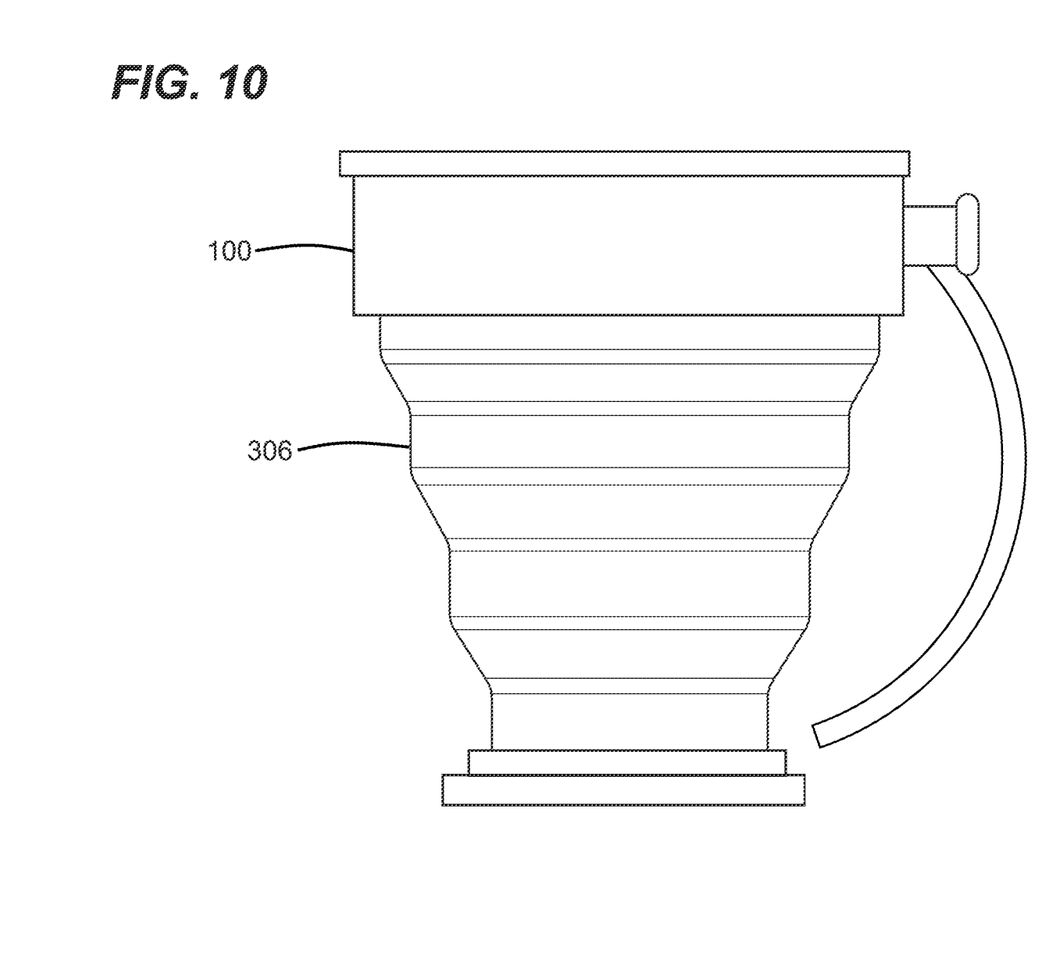
FIG. 10 is a perspective view of another embodiment of a cover in a collapsible folding arrangement.

FIG. 10 is a perspective view of the cover 100 formed of a collapsible folding material, such as the material used to make a collapsible cup 306. In the view of FIG. 10, the cover 100 is shown in the expanded position, and it can be collapsed to a short position.

Figure 11:
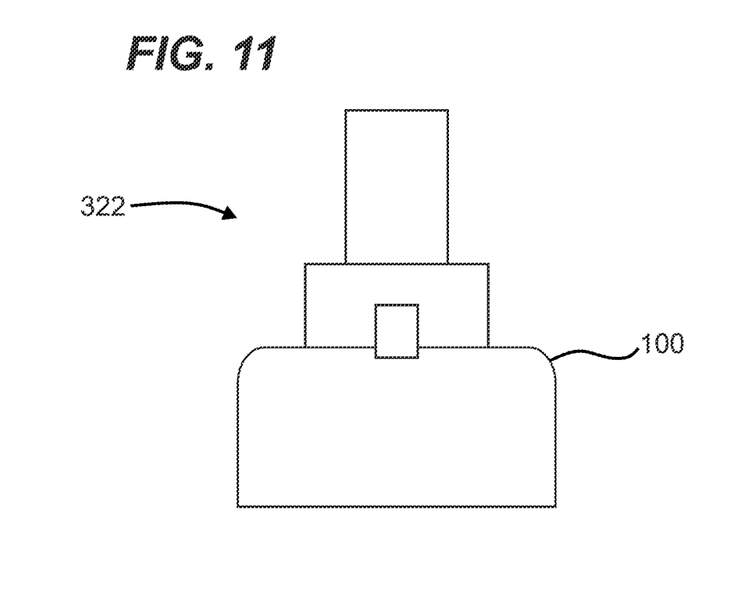
FIG. 11 is a top view of another embodiment of a cover, showing a female connector.
Figure 12:
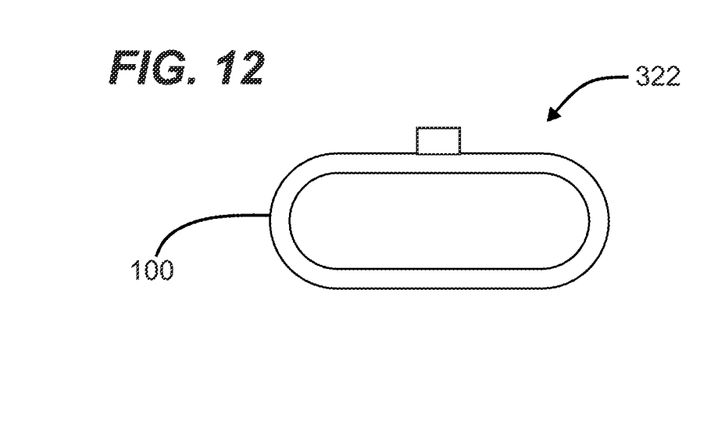
FIG. 12 is a front view of the cover of FIG. 11.
Figure 13:
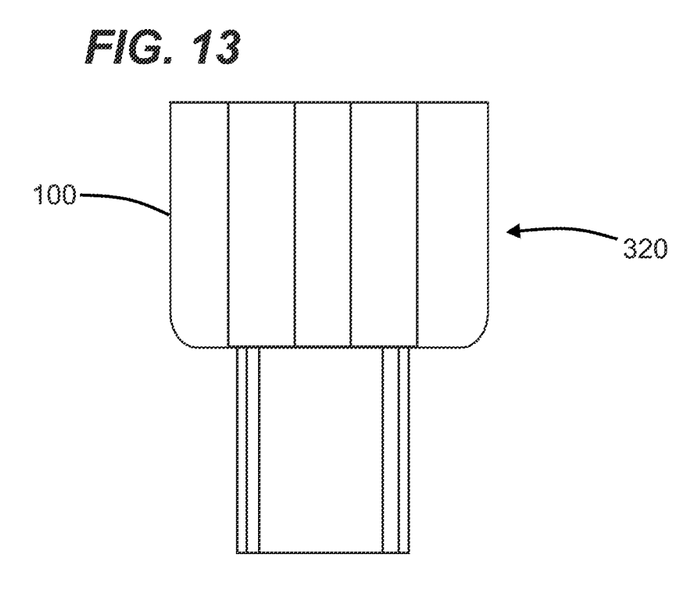
FIG. 13 is a top view of a male connector, shaped to mate with the female connector of FIGS. 11 and 12.
Figure 14:
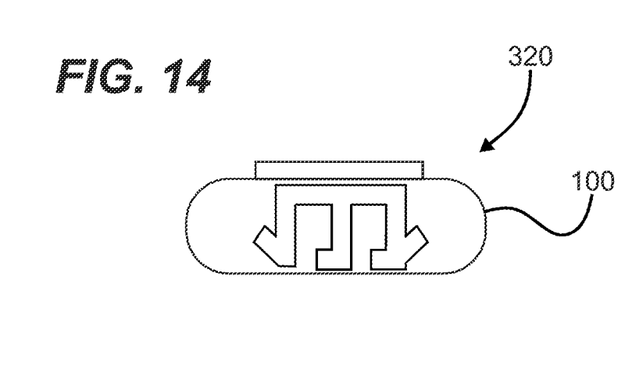
FIG. 14 is a front view of the male connector of FIG. 13.

The cover 100 can also be embodied in a mating male 320 and female 322 connector joint. FIGS. 11 and 12 show the female connector 322, while FIGS. 13 and 14 show the male connector.

Figure 15:
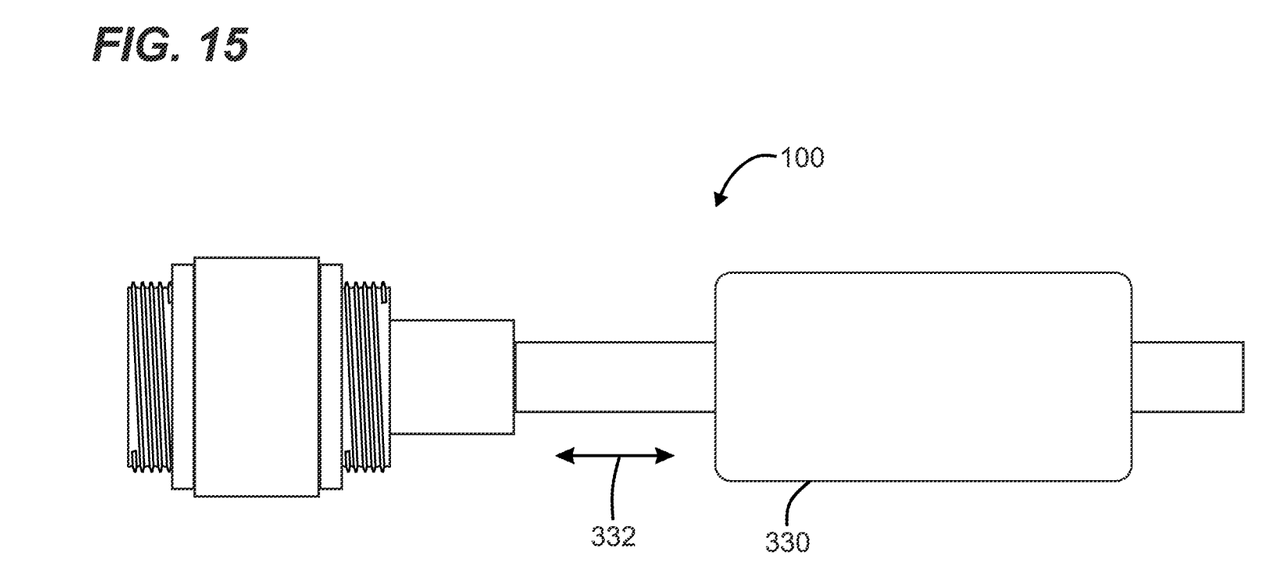
FIG. 15 is a top view of another embodiment of a cover, showing the cover as a single piece.

FIG. 15 is a top view of another embodiment of cover 100, showing the cover 100 as a sliding single piece 330. The piece 330 can be moved along the direction of the arrow 332 to adjust the length.

Figure 16:
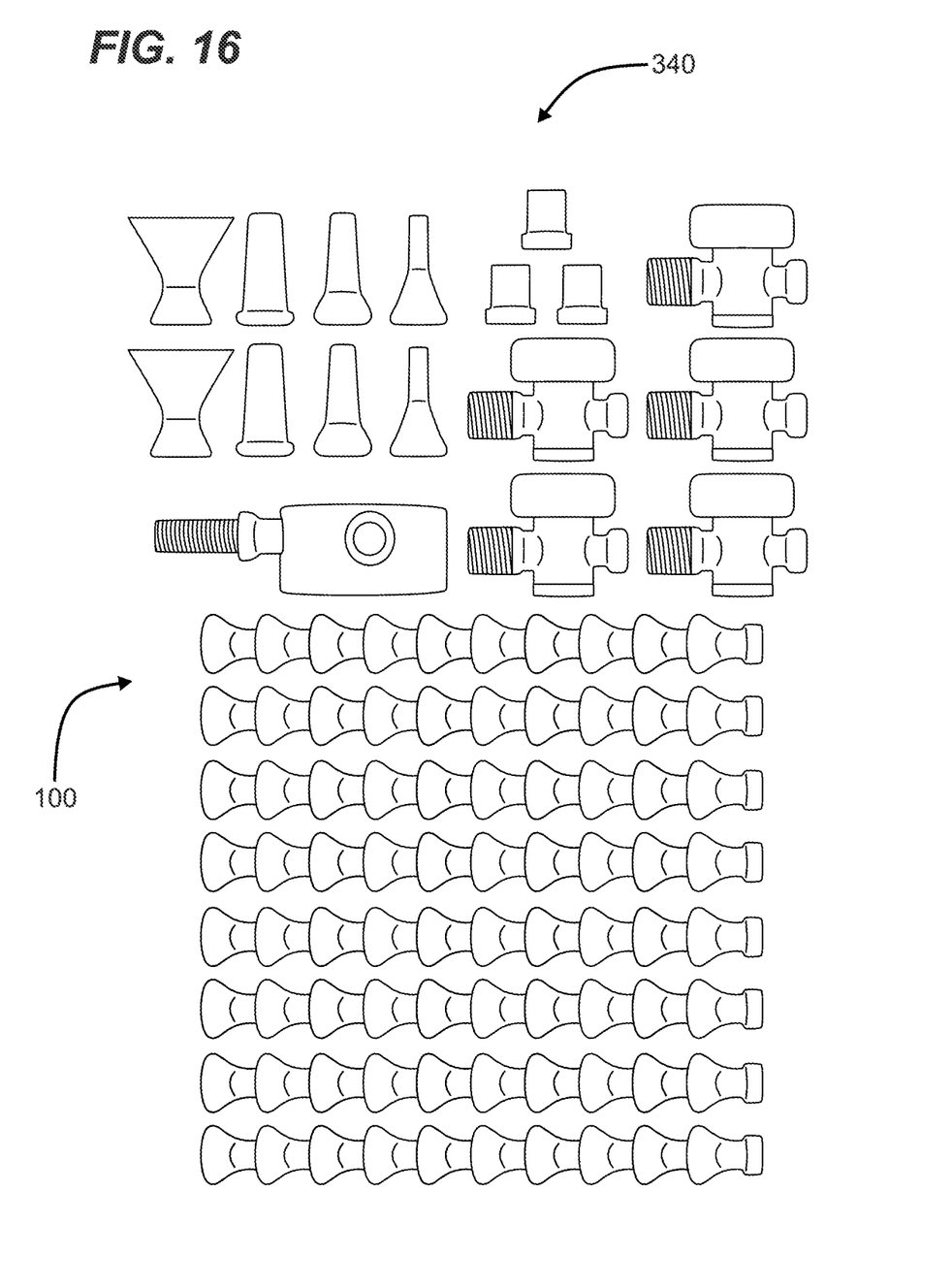
FIG. 16 is a top view of a multipiece interlocking pieces system for use as a cover.

The cover 100 can be part of a multipiece interlocking pieces system 340. The number of interlocking pieces used will determine the length of the cover 100.

Figure 17:
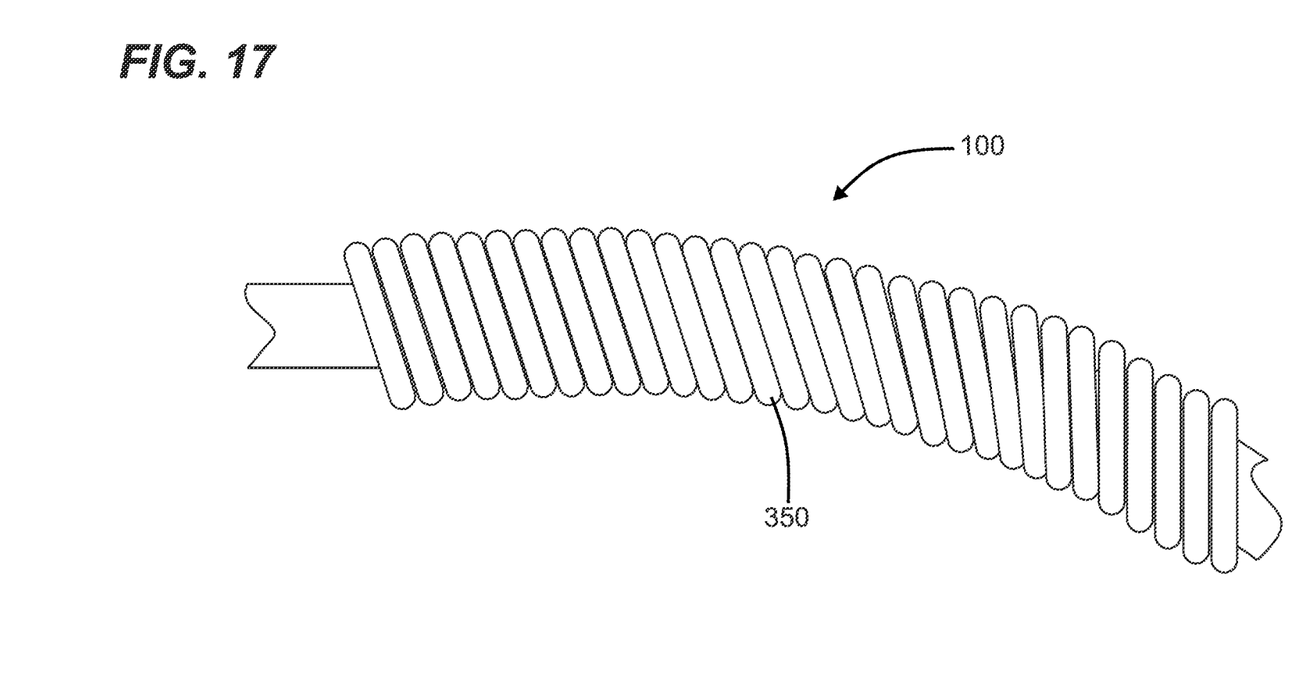
FIG. 17 is a top view of a helical wrap for use as a cover.

In FIG. 17, a helical wrap 350 is used as the cover 100.

Figure 18:
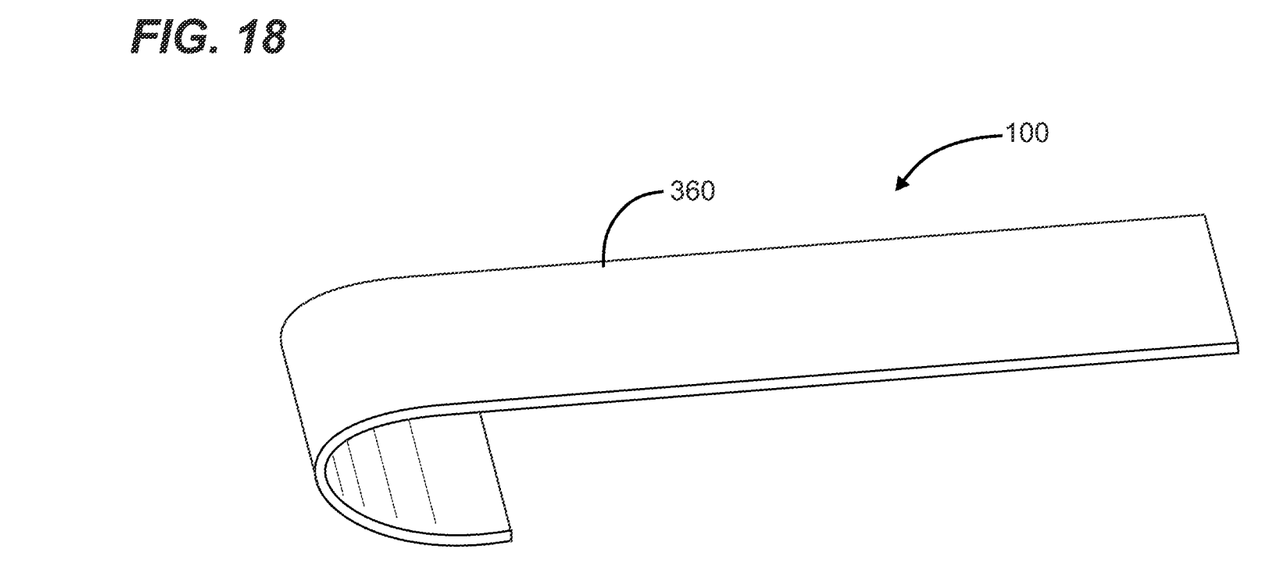
FIG. 18 is a perspective view of a snap flexible material for use as a cover.

FIG. 18 is a perspective view of a snap flexible material 360 for use as cover 100. The snap flexible material 360 can be the type of material used as, for example, a snap bracelet.

Figure 19:
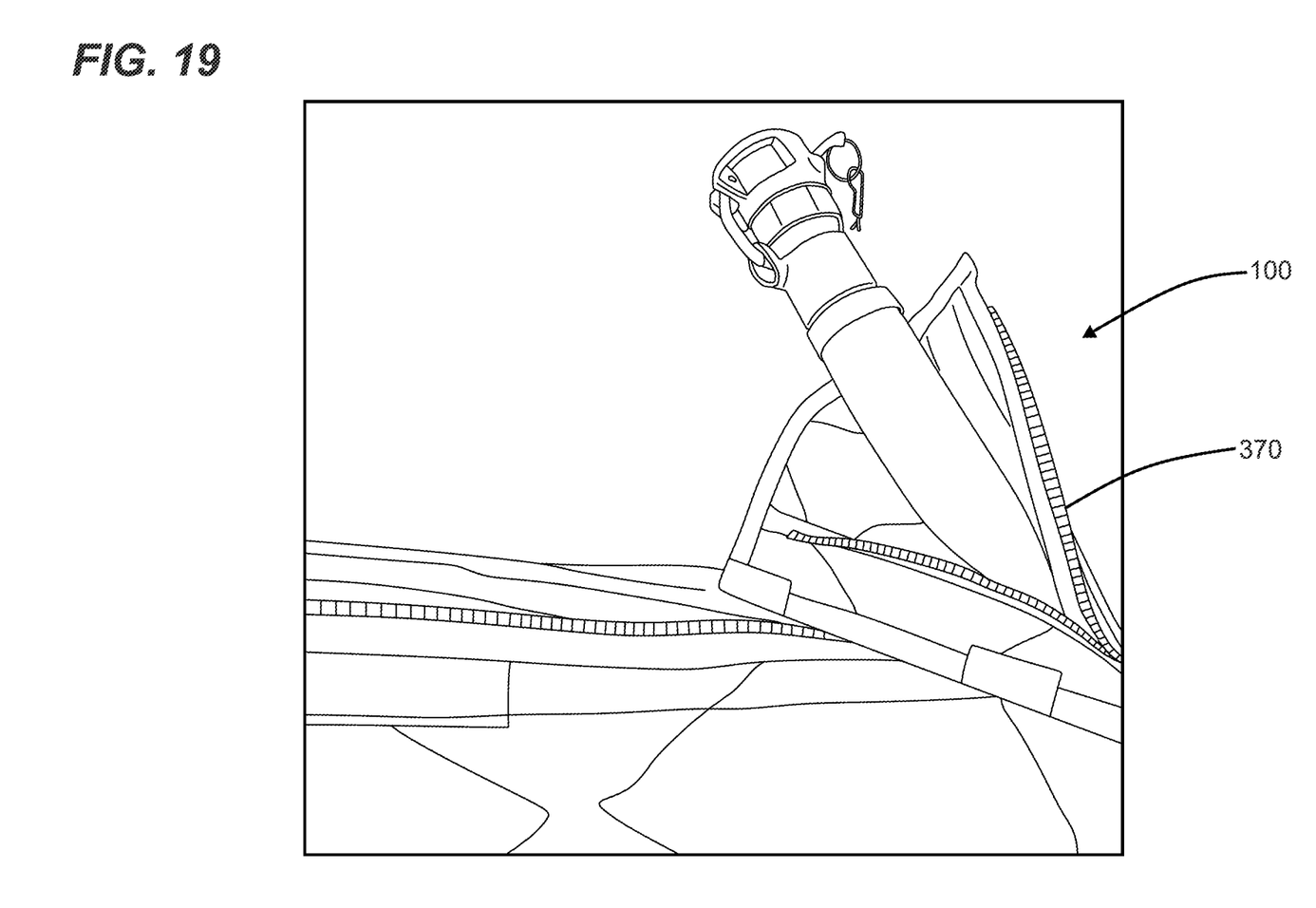
FIG. 19 is a perspective view of a fastener insulation for use as a cover.

The cover 100 can use an insulated cover 370 having a fastener, such as a hook and loop fastener system (such as VELCRO Brand hook and loop fastener), or a zipper.

In other embodiments, the cover can use twist compression; roll on/roll off; or loose bag and retention.

The above represents example principles. Many embodiments can be made using these principles.

What is claimed is:

1. A system comprising:
   (a) a first conduit and a second conduit;
   (b) a coupling connecting together the first conduit and second conduit;
   (c) a first cover removably secured to the first conduit; and a second cover removably secured to the second conduit; each of the first cover and second cover including,
      (i) a single body having a wall surrounding an interior volume; the body having a first open end and an opposite second open end; each of the first open end and second open end being in communication with the interior volume to form a through opening from the first open end to the second open end;
      (ii) the body having a neck defining the first open end;
      (iii) the body having size-adjustable section to permit the body to be shortened or lengthened; and
      (iv) the body having a casing section defining the second open end;
   (d) the neck of the first cover being sized to grip a portion of the first conduit;
   (e) the neck of the second cover being sized to grip a portion of the second conduit; and
   the casing section of at least one of the first cover and of the second cover covering the coupling.

2. The system of claim 1 wherein the body of each of the first and second covers comprises a single material of rubber.

3. The system of claim 1 wherein the size-adjustable section of each of the first and second covers comprises a plurality of folds.

4. The system of claim 1 wherein the size-adjustable section of each of the first and second covers is between and continuous with the neck and the casing section.

5. The system of claim 1 wherein the first and second conduits are hoses.

6. The system of claim 1 wherein the first and second conduits are pipes.

7. The system of claim 1 wherein the body has a longitudinal axis extending between the first and second open ends, and the size-adjustable section permits the body to be shortened or lengthened along the longitudinal axis.

8. A method of covering a coupling connecting together a first conduit and a second conduit; the method comprising:
   (a) removably securing a first cover to the first conduit;
   (b) removably securing a second cover to the second conduit;
   (c) connecting together the first conduit and second conduit using a coupling; and wherein each of the first cover and second cover includes,
      (i) a single body having a wall surrounding an interior volume; the body having a first open end and an opposite second open end; each of the first open end and second open end being in communication with the interior volume to form a through opening from the first open end to the second open end;
      (ii) the body having a neck defining the first open end;
      (iii) the body having size-adjustable section to permit the body to be shortened or lengthened; and
      (iv) the body having a casing section defining the second open end;
   (d) the neck of the first cover being sized to grip a portion of the first conduit;
   (e) the neck of the second cover being sized to grip a portion of the second conduit; and
   (f) the casing section of at least one of the first cover and of the second cover covering the coupling.

9. The method of claim 8 including a step of adjusting the length of the first cover and second cover.

10. The method of claim 9 wherein the body has a longitudinal axis extending between the first and second open ends; and
   the step of adjusting the length includes shortening or lengthening the size-adjustable section of the first cover and second cover along the longitudinal axis.

11. The method of claim 8 wherein the step of removably securing a first cover to the first conduit includes securing the first cover to a hose or a pipe.

12. The method of claim 8 wherein the step of removably securing a second cover to the second conduit includes securing the second cover to a hose or a pipe.

* * * * *